May 13, 1924. 1,493,632
J. A. JOHNSON
CHAIN HOOK
Filed Dec. 4, 1922
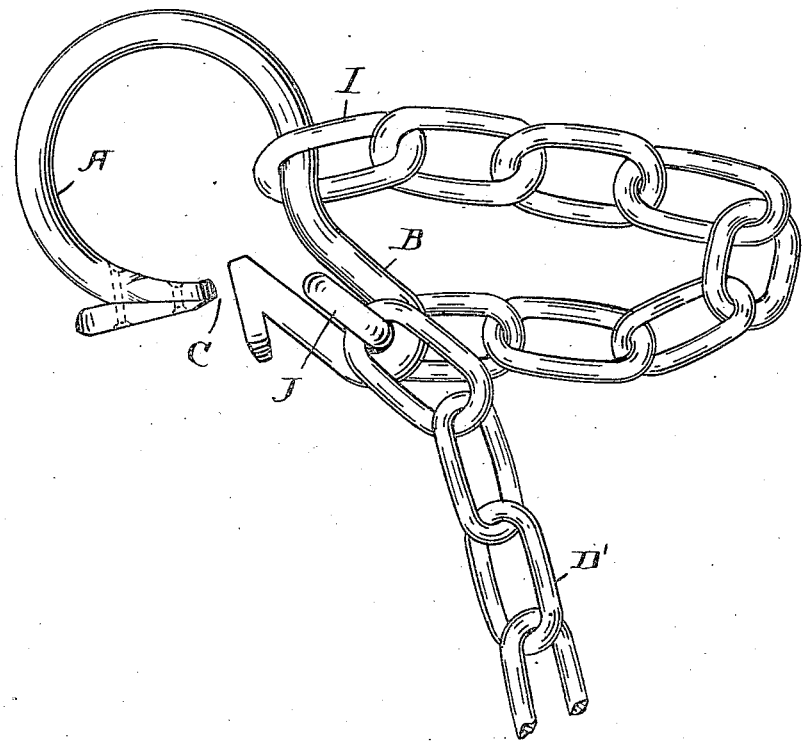
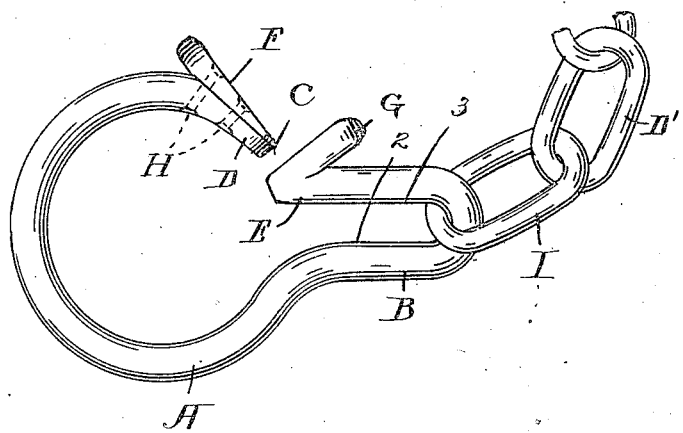
Inventor:
James Ashley Johnson,
by: Bradbury & Caswell
Attorneys.

Patented May 13, 1924.

1,493,632

UNITED STATES PATENT OFFICE.

JAMES ASHLEY JOHNSON, OF YUMA, ARIZONA.

CHAIN HOOK.

Application filed December 4, 1922. Serial No. 604,766.

*To all whom it may concern:*

Be it known that I, JAMES ASHLEY JOHNSON, a citizen of the United States, residing at Yuma, in the county of Yuma and State of Arizona, have invented new and useful Improvements in Chain Hooks, of which the following is a specification.

My invention relates to a hook and more particularly to that class of hooks which is adapted for use as a terminal element on draw chains and wherein it may be used as a grab hook to engage an intermediate link of the chain to shorten or let out the pulling portion of the chain and at the same time serve as a large hook or ring to hold the loop portion of loose chain and to engage and fasten any object or a companion hook on an opposite portion of the chain. The chain upon which my improved hook is adapted to be used may be of the kind used in logging or for any other purpose where a draw or pull is to be made or objects fastened together. The primary object of my invention is to provide a double hook of the kind stated which facilitates adjusting the length of the chain and fastening the ends of the chain together or to an object. A further object is the production of a hook of the kind stated which is strong, durable and inexpensive in construction and effective in use.

The accompanying drawing forming part of this specification illustrates in perspective a portion of a chain having each of its opposite ends provided with my improved hook, a portion of the chain being taken up by one of the hooks to shorten the chain in a manner in which the hooks are adapted to be used.

My improved hook is formed by a rod or piece of metal or other suitable material bent between its ends into a large circular body A resembling a ring and formed with a deep elongation B resembling an appendage on the side of the body. A portion of the structure is formed with a narrow entrance or gate C into the ring portion at a point substantially at the junction of the body and appendage portions, thus resulting in the formation of a large hook or ring A and an adjacent small hook B, the large and small hooks being interconnected and provided with a single gate entrance. The sides 2 and 3 of the small hook are long and parallel and positioned a short distance apart to admit the body of any one of the links D' of the chain sideways through the opening in the hook. The two ends D and E forming the opposite sides of the entrance or gate C are provided with outwardly spreading guards F and G which shield the hook from catching on brush or other objects when the chain is dragging or in use. They also prevent the hook from becoming detached from the terminal link to which the hook is fastened. The guard F is secured to the body member A by rivets H but before fastening the end D is passed through the terminal link I of the chain. The two guards G and F prevent the hook from becoming detached from the link I.

The hook facilitates taking up or letting out the chain to shorten or lengthen, by engaging the hook member B with an intermediate link such as J, in which event the body serves to hold the loose end or loop as shown in the drawing. The deep channel in the hook member B holds the chain securely and the narrowness of the channel prevents an adjacent link from slipping through. The large hook or ring serves to readily engage the hooks on the opposite ends of the chain together or an individual fastening means for securing the chain to another chain, cross tree or any other object or device. Its diameter is made sufficient to readily apply the hook for the purposes intended. The single gate-way C, facilitates engaging the large or elongated hook to any object desired.

Having described my invention what I claim as new and desire to secure by Letters Patent is:

1. A hook member formed with a body hook of large size and with an elongated hook connected with the large hook, said hooks having a single gate-way through one of the side members of the structure near the junction of the two hook members.

2. A hook member formed with a body hook of large size and with an elongated hook connected with the large hook, said hooks having a single gateway through the structure near the junction of the two members and the sides of said gateway being formed with outwardly spreading guard flanges.

In witness whereof, I have signed my name to this specification.

JAMES ASHLEY JOHNSON.